(12) United States Patent
Stockmann

(10) Patent No.: US 7,831,214 B1
(45) Date of Patent: Nov. 9, 2010

(54) LOW POWER LINEAR TRANSMIT/RECEIVE (T/R) MODULE

(75) Inventor: Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1295 days.

(21) Appl. No.: 11/361,388

(22) Filed: Feb. 24, 2006

(51) Int. Cl.
*H04B 1/46* (2006.01)

(52) U.S. Cl. .............................. 455/82; 455/78; 455/79; 455/83; 455/84

(58) Field of Classification Search ............. 455/78–86; 330/282, 302, 310
See application file for complete search history.

(56) References Cited

U.S. PATENT DOCUMENTS

| | | | | |
|---|---|---|---|---|
| 5,027,084 A | * | 6/1991 | Tsukii ........................ | 330/295 |
| 5,590,412 A | * | 12/1996 | Sawai et al. .................... | 455/82 |
| 5,903,820 A | * | 5/1999 | Hagstrom ..................... | 455/82 |
| 6,236,840 B1 | * | 5/2001 | Aihara et al. .................. | 455/83 |
| 6,400,963 B1 | * | 6/2002 | Glockler et al. .......... | 455/553.1 |
| 6,957,047 B1 | * | 10/2005 | Young et al. .................. | 455/83 |
| 7,212,788 B2 | * | 5/2007 | Weber et al. .................. | 455/78 |

* cited by examiner

*Primary Examiner*—Tuan A Tran
(74) *Attorney, Agent, or Firm*—Howard IP Law Group, PC

(57) ABSTRACT

A T/R module utilizes a low noise amplifier in both the transmit and receive modes. In this manner the low noise amplifier enables one to provide a T/R module which has reduced prime power and lower weight and particularly useful in airship radar systems and spaced based radar systems. The low noise amplifier is switched between a receive and a transmit mode by switching mechanism which in the receive mode enables the antenna to be directed to the input of the low noise amplifier with the output of the low noise amplifier directed to a phase shifter and attenuator. The switching operates in a transmit mode where the output of the low noise amplifier is connected to the input of the antenna while the input of the low noise amplifier is now connected to the phase shifter and attenuator for providing a transmit signal. The invention has an additional benefit of enabling linear Class A operation in the transmit mode in both radar and communication systems supporting beam shaping and waveform shaping capabilities. A 100% transmit duty cycle for communications is also supported.

28 Claims, 1 Drawing Sheet

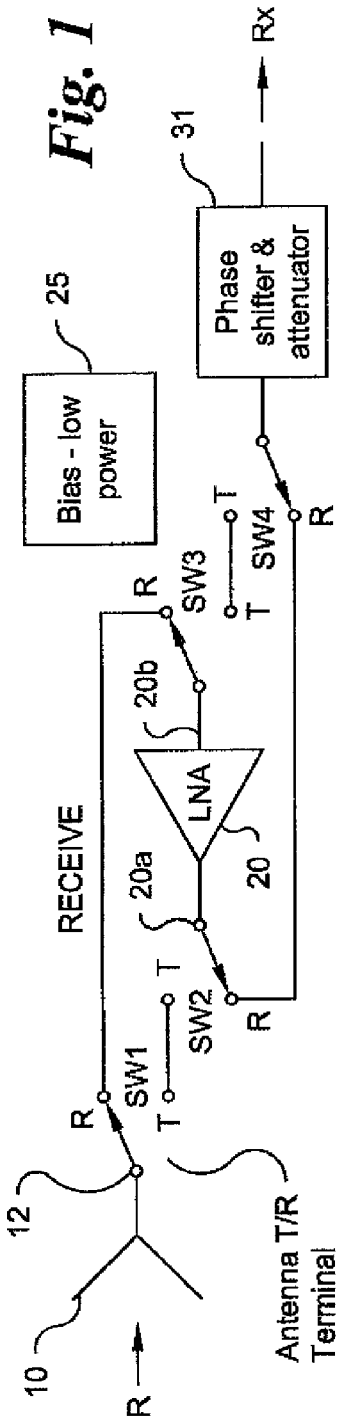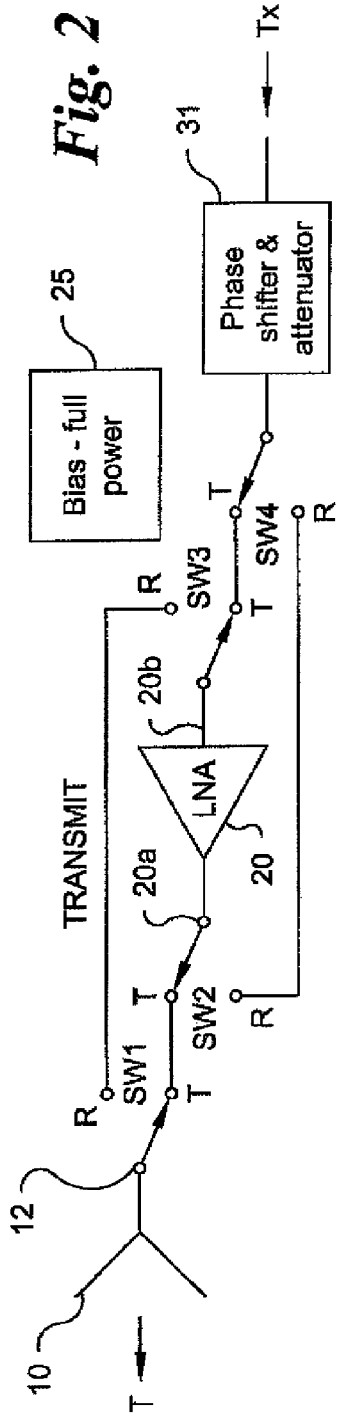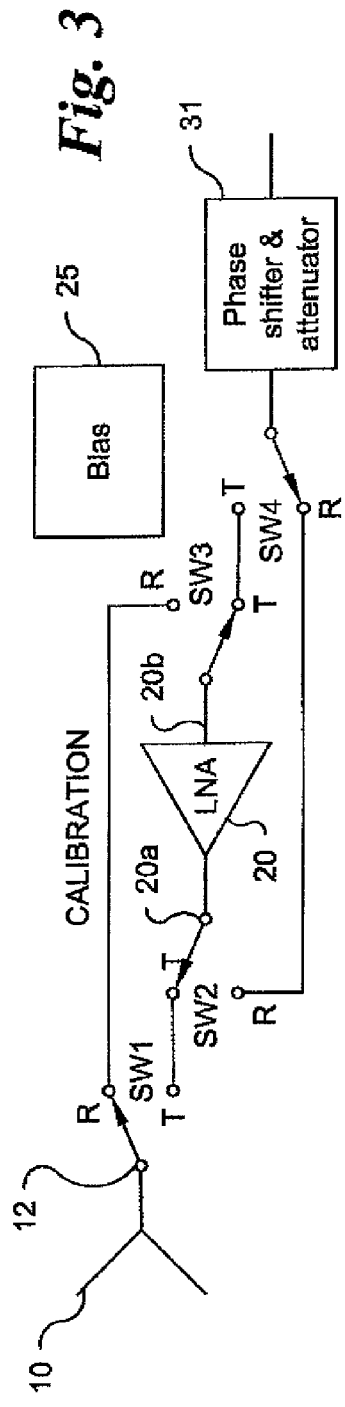

LOW POWER LINEAR TRANSMIT/RECEIVE (T/R) MODULE

GOVERNMENT LICENSE RIGHTS

The invention was made with government support, under government contract number HR0011-04-C-0093. The government may have certain rights in this invention.

FIELD OF THE INVENTION

This invention relates generally to a transmit/receive (T/R) module, and more particularly, to a T/R module having reduced prime power and reduced weight for use in space based or airship radar systems or other applications.

BACKGROUND OF THE INVENTION

Transmit/receive arrangements are often employed in communication systems, including data transmission, radar and active phased array systems. A transmit/receive arrangement is utilized so that one can use the same amplifier for the transmission of signals and for the reception of signals. In this manner the system works in a first transmit mode where a signal is transmitted from the antenna and in a second receive mode where a signal is received from the antenna. The system therefore requires a transmit/receive switching functionality between modes thereby enabling the system to perform in a transmit as well as in a receive mode. For multi-element phased arrays, this function is generally enabled with transmit/receive modules or T/R modules. Such modules, in most systems, utilize separate transmit and receive amplifiers. In the case of space-based or airship radar systems or other systems which require very low power and/or very low weight, separate amplifiers and other components adds to the weight and the prime power drain. Space based radar (SBR) systems and airship radar systems are examples of applications that are particularly sensitive to low power and low weight requirements. Of course, other systems and applications may also require low power and/or low weight components as well. Apparatus including at least one T/R module that addresses one or more of the aforementioned problems is therefore highly desirable.

SUMMARY OF THE INVENTION

The present invention relates to a transmit/receive module which reduces weight, complexity and prime power and has applicability, for example, to space based radar (SBR) systems and airship radar systems. The invention also supports a linear transmit capability which enhances flexibility, supports transmit aperture amplitude tapering, multiple transmit beams, pulse shaping for reduced electromagnetic interference (EMI) to other systems, and 100% duty cycle operation for multiplexed communications According to an aspect of the invention, a low power linear on transmit T/R module comprises a low noise amplifier (LNA) having an input terminal for receiving a signal and an output terminal for providing an amplified output of the input signal. A switching arrangement is coupled to the LNA and operative in a first receive mode to connect the input terminal of the LNA to an antenna transmit/receive terminal and to connect the output terminal of the LNA to a processing circuit. The switching arrangement is operative in a second transmit mode to connect the input terminal of the LNA to the processing circuit and to connect the output terminal of the LNA to the antenna transmit/receive terminal.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 1 is a schematic view of a very low RF power linear on transmit T/R module operative in a receive mode; and, FIG. 2 is a schematic diagram of the T/R module as depicted in FIG. 1 operating in a transmit mode; and, FIG. 3 is a schematic diagram of the T/R module as shown in FIGS. 1 and 2 operated in a calibration mode.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in typical antenna systems and methods. However, because such elements are well known in the art, and because they do not facilitate a better understanding of the present invention, a discussion of such elements is not provided herein.

Referring to FIGS. 1, 2 and 3 there is shown the apparatus employed in conjunction with the transmit/receive switch according to an embodiment of the present invention. For simplicity, similar performing modules have been designated with like reference numerals. In regard to the transmit/receive switching according to the present invention, FIG. 1 shows the module in a receive mode while FIG. 2 shows the module in a transmit mode. FIG. 3 shows the module in a calibration mode.

As shown in FIG. 1, antenna 10 receives an input signal (R). The output terminal 12 of the antenna is designated as the antenna T/R terminal and is coupled to the common contact of a first switch SW1. Switch SW1 can be operated in either a receive position R or in a transmit position T. During the receive mode, the common arm of the switch SW1 is connected to the receive contact or pole R. In a similar manner, switch SW2 can be operated in a receive position (R) as shown in FIG. 1 or in a transmit position (T). A low noise amplifier (LNA) 20 has its output 20a coupled to the common terminal of switch SW2 which as indicated, can switch between the receive position R or transmit position T. The input 20b to the LNA amplifier 20 is also coupled to a common terminal switch SW3. In a similar manner, switch SW3 can be operated in a receive position (R) or in a transmit position (T). FIG. 1 illustrates the switch SW3 operated in a receive position. Switch SW4 can also be operated in a receive position (R) as shown in FIG. 1 or in a transmit position (T). The common terminal of switch SW4 is also coupled to the output of a phase shifter and attenuator 31. Thus, FIG. 1 illustrates the situation wherein switches SW1, SW2, SW3 and SW4 are all operative in a receive position. In some applications, the LNA is biased to a first low power output in the receive mode (FIG. 1), at a lower drain current level, and a second higher power output in the transmit mode (FIG. 2), at a higher drain current level. Reference numeral 25 schematically represents the biasing of LNA(s) according to the particular mode and operation of the apparatus. The biasing may be configured and/or controlled by a microcontroller or controller logic coupled to the module for providing the appropriate high or low power biasing corresponding to the particular configuration (e.g. transmit, receive, calibration) of the T/R unit.

In the receive position of FIG. 1 the input signal to the antenna is designated by the arrow reference R and is received by antenna 10. The received signal R is coupled via switch SW1 to the input terminal of the low noise amplifier or LNA 20 via switch SW3. The output terminal of LNA 20 is coupled via switch SW2 to the input terminal of the phase shifter and attenuator 31 via switch SW4 which provides at its output a processed receive signal RX. This signal RX is directed to suitable receiving circuitry for further processing the same. The biasing is operative to create a low power mode evidenced by reduced drain current by the LNA 20. The phase shifter and attenuator 31 is a well known component and may be, for example, a reciprocal (bi-directional) device such that the input and output can be switched (as shown, for example, in FIGS. 1 and 2). Reciprocal phase shifters and attenuators are well known in the field and include, for example, a simple reciprocal phase shifter that may employ passive components such as capacitors and resistors as well as active devices. It is also known that digital phase shifting can be employed and may be attained, for example, by FET phase shifting circuits. Other such phase shifter/attenuator implementations and combinations of phase shifter/attenuator module 31 are also contemplated and are well known and utilized in the art.

Thus, as shown in FIG. 1, in the receive mode the input of the phase shifter and attenuator is derived from switch SW4 and the output of the phase shifter and attenuator is designated as RX. In FIG. 2, the output of the phase shifter 31 is coupled to the common terminal of SW4 in the transmit mode, while the input to the phase shifter and attenuator 31 is designated as TX.

Referring now to FIG. 2 the same circuit components as depicted in FIG. 1 are shown, except that the switches SW1, SW2, SW3 and SW4 are all operative in the transmit or T position. With the T/R module now positioned in the transmit mode, a signal $T_X$ is applied to the input of the reciprocal phase shifter and attenuator 31 via SW4. The output is directed through the transmit terminal of SW4 to the input 20b of the LNA 20. The output of the LNA 20 is now directed through the T terminal of SW2 to the transmit contact of SW1 and applied to the antenna 10. Thus the apparatus now applies the amplified input signal $T_X$ amplified via LNA 20 to the antenna 10 for transmission.

As shown in FIG. 2, in the transmit mode LNA 20 is biased to full operating power, but still operates at a very low power level, relatively speaking, suitable for space based radar systems and airship radar systems.

As shown in FIG. 3, the T/R module is operational in a calibration mode when the input of the LNA 20 is connected to the T terminal of switch SW3. The T terminal of switch SW4 is connected to the T terminal of second switch SW2. The output of the LNA is connected to the T terminal of the first switch SW1. In this configuration, the switches are operative to isolate the input terminal and the output terminal of the LNA from the antenna and phase shifter to calibrate the phase shifter and attenuator characteristics of a set of T/R modules. The open position of SW1 and SW4 provides additional input and output isolation in the LNA 20 for calibration purposes.

In accordance with an aspect of the present invention, implementation of the low noise amplifier as discussed herein enables one to achieve superior operation of the T/R module with unanticipated results. In an exemplary configuration, the LNA 20 may be a MMIC amplifier. It is to be understood that a low noise receiver is desirable in a radar system and considerable effort has been expended to develop more sensitive receivers which have low noise figures and low noise temperatures. The noise figure and noise temperature generally serve as a measure of the quality of a receiver. MMIC amplifiers have improved steadily with emphasis on lowered prime power, increased dynamic range, lower noise figures and increased operating frequency.

In an exemplary embodiment, a parametric amplifier uses a varactor diode which acts as a capacitance and which varies at the pump frequency (which is typically K band for a microwave amplifier). While K band is used in radar operation, the present invention is not limited to K band. The varactor operates in conjunction with a circulator which produces an amplified reflected signal from the circulator port. A balanced mixer is often used to convert from RF to IF in the receive mode. In any event, both transistor-operated low noise amplifiers as well as parametric low noise amplifiers may be suitable for this particular application.

An exemplary embodiment utilizes transistors to implement the LNA 20 shown in FIGS. 1, 2 and 3. These amplifiers use field effect transistors and other high frequency devices. Such FETS may be GaAs or silicon devices. In a similar manner the switches SW1, SW2, SW3 and SW4 are shown as single pole, double throw switches, however, other switch configurations may also be implemented. Such switches may be fabricated utilizing PIN diodes, avalanche diodes and other microwave devices operable as high frequency switching devices. Furthermore, while four switches are shown, it is understood that more or less switches may be used.

As is understood, PIN diodes employ a wide intrinsic region which offers an impedance at microwave frequencies which is controllable by a lower frequency or DC bias. They have proved useful for microwave switches and other devices. The PIN diode is a preferred switching device but other devices, such as avalanche diodes or Schottky barrier diodes, can be utilized as well. In a similar manner one can employ field effect transistors which are microwave solid state devices. Using the higher mobility and saturated velocity of gallium arsenide, amplified gain in such devices had been attained at frequencies above 40 GHz. These devices dominate low noise applications in the intermediate microwave region. Therefore, such a FET can be employed to implement the LNA 20, and has an opened input terminal and output terminal. The LNA 20 can thus be calibrated and its gain and bandwidth varied in a pre calibration mode. In a calibration mode the LNA 20 and the phase shifter 31 as well as the biasing can be tuned or calibrated so that appropriately conditioned signals are provided.

In accordance with an aspect of the present invention, the configuration described reduces weight and prime power in SBR and airship applications where weight and power are very limited. The solution proposed and implemented supports as well a linear transmit capability. Based on the fact that one now employs a linear transmit capability, this enhances flexibility, and supports transmit aperture amplitude tapering, multiple transmit beams, as well as waveform shaping for reduced electromagnetic interference (EMI) The transmit linearity is also important for communications, a potential application on a multiplexed basis with the radar functionality. Transmit linearity allows the amplitude and phase of a waveform to be transmitted which is important in communications. The transmit mode also supports a 100% duty cycle which is important for communications. The switches as shown in FIGS. 1, 2 and 3 can operate between the receive and transmit mode and are switched by means of controlling the biasing on such switches. In an exemplary configuration, bias control may be implemented using diode switches.

According to an exemplary embodiment, the LNA 20 is a generally ungated device and may be implemented using FET components. This device draws drain current during transmission. The otherwise unused drain current is used to support the transmit function, thereby enhancing overall power efficiency. Transmit Class A linearity, although desirable, is normally not achieved because it is not sufficiently power efficient as compared to Class C operation. Class A amplifier operation is well known. In Class A the quiescent operating point of the amplifier is in the linear region so that the amplified output signal is an accurate replica of the input signal. For example, for a sinusoidal input, the output is an amplified sinusoidal signal with very little distortion as compared to Class C operation. However, the LNA 20 according to the present invention may have at least an 80 dB dynamic range supporting highly linear transmit functionality as is typically available for conventional LNA devices. The transmit linearity allows for amplitude tapering for side lobe control and supports amplitude and phase control required for beam spreading (also called spoiling), The transmit linearity supports multiple simultaneous transmit beams which requires amplitude and phase control. The transmit linearity supports slow rise and fall times of the transmit pulse, normally unachievable with Class C operation, lowering the spectral sidelobes for EMI/EMC and for NTIA/ITU compliance. Further, the invention generally eliminates RF transmit amplifier gating, circulators and T/R limiters. Because the LNA 20 is not gated, pulse to pulse phase pushing based on PRF switching and its impact on clutter cancellation is mitigated.

The apparatus including the T/R module according to the present invention may be configured on one or more MMIC substrates and incorporated into a plastic packaging for insertion into an array grid in a phased array, for example. The packaging dimensions and corresponding structure may be manifest in various configurations according to the particular application requirements, as is understood by those of ordinary skill in the art.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A low power linear transmit/receive (T/R) module, comprising:
    a unidirectional low noise amplifier (LNA) having an input terminal for receiving a signal and an output terminal for providing an amplified version of said input signal;
    a switching arrangement comprising first, second, third and fourth switches coupled to said LNA and operative in a first receive mode to connect said input terminal of said LNA to an antenna transmit/receive terminal and to connect said output terminal of said LNA to a processing circuit, said switching arrangement operative in a second transmit mode to connect said input terminal of said LNA to said processing circuit and to connect said output terminal of said LNA to said antenna transmit/receive terminal, wherein
    said first switch comprising a common terminal connected to said antenna transmit/receive terminal,
    said second switch comprising a common terminal connected to the output terminal of said LNA,
    said third switch comprising a common terminal connected to said input terminal of said LNA, and
    said fourth switch comprising a common terminal connected to said processing circuit, wherein said processing circuit includes a reciprocal phase shifter and attenuator.

2. The T/R module according to claim 1, wherein said LNA is biased to a relatively low operating power in said receive mode, and is biased to a relatively higher operating power in said transmit mode.

3. The T/R module according to claim 2 wherein said LNA operates substantially as a class A amplifier during said transmit and receive modes.

4. The T/R module according to claim 1, wherein said first, second, third, and fourth switches comprise single pole double throw switches, said common terminal of each switch can switch between a receive contact (R) and a transmit contact (T) with said R contact of said first switch connected to said R contact of said third switch, with the T terminal of said third switch connected to the T terminal of said fourth switch, with the R terminal of said fourth switch connected to the R terminal of said second switch, with the T terminal of said second switch connected to the T terminal of said first switch whereby in said first receive switching mode the input terminal of said LNA is connected to said antenna transmit receiver terminal and with the output terminal of said LNA connect to said phase shifter and attenuator and wherein said second transmit switching mode the output of said LNA is connected to said antenna transmit receive terminal with the input of said LNA connected to said phase shifter and attenuator.

5. The T/R module according to claim 1, wherein said LNA amplifier is a FET amplifier.

6. The T/R module according to claim 5, wherein said FET amplifier comprises a GaAs FET.

7. The TAR module according to claim 1, wherein said module is incorporated within an airship radar.

8. The T/R module according to claim 1, wherein said module is incorporated within a space based radar (SBR).

9. The T/R module according to claim 1, wherein said LNA has at least an 80 dB dynamic range.

10. The T/R module according to claim 1, wherein said switching arrangement includes microwave diodes.

11. The T/R module according to claim 10, wherein said microwave diodes are pin diodes.

12. The T/R module according to claim 1, wherein said processing circuit includes a FET.

13. The T/R module according to claim 1, wherein said phase shifter and attenuator employ FET devices.

14. The T/R module according to claim 13, wherein said FET devices are GaAs devices.

15. The T/R module according to claim 1, wherein each switch is selectively sellable to provide a high isolation between the input and output of the T/R module in a calibration mode.

16. The T/R module according to claim 1 wherein during said transmit mode said LNA operation allows aperture amplitude tapering of said antenna pattern for side lobe control.

17. The T/R module according to claim 1 wherein during said transmit mode said LNA enables multiple, simultaneous transmit beams.

18. The T/R module according to claim 1, wherein during said transmit mode said LNA supports amplitude and phase control of said antenna pattern to enable beam spreading.

19. A low power linear transmit/receive (T/R) module, comprising:
    a unidirectional low noise amplifier having an input and an output terminal;
    switching means comprising first, second, third and fourth switches coupled to said low noise amplifier for connecting said input terminal to a receive/transmit antenna terminal and connecting said output terminal to an input means in a first receive mode, said switching means operative in a second transmit mode to connect, said input terminal of said low noise amplifier to said input means and connecting said output terminal to said receive/transmit antenna terminal;

wherein in said first receive mode said first and third switches connect said input terminal to said receive/transmit antenna terminal and said second and fourth switches connect said output terminal to said input means, and in said second transmit mode said third and fourth switches connect said output terminal to said receive/transmit antenna terminal and said first and second switches connect said input terminal to said input means, wherein said inputs means is a reciprocal phase shifter and attenuator.

20. The T/R module according to claim 19, wherein said receive/transmit antenna terminal is connected to an antenna.

21. The T/R module according to claim 19, wherein said LNA is an ungated amplifier operating relatively at Class A operation and having an 80 dB dynamic range.

22. The T/R module according to claim 21, wherein said Class A operation supports at least one of transmit aperture tapering, linear transmit waveform amplification and multiple transmit beam operations.

23. The T/R module according to claim 19, wherein said switching means provides operation of said LNA in a calibration mode where said input and output terminals are opened.

24. A low power linear transmit/receive (T/R) module, comprising:

a low noise amplifier (LNA) having an input terminal for receiving a signal and an output terminal for providing an amplified version of said input signal; and a switching arrangement coupled to said LNA and operative in a first receive mode to connect said input terminal of said LNA to an antenna transmit/receive terminal and to connect said output terminal of said LNA to a processing circuit, said switching arrangement operative in a second transmit mode to connect said input terminal of said LNA to said processing circuit and to connect said output terminal of said LNA to said antenna transmit/receive terminal, and said switching arrangement operative in a third calibration mode to provide a high isolation between said input terminal of said LNA and said output terminal of said LNA, wherein said processing circuit includes a reciprocal phase shifter and attenuator.

25. The T/R module according to claim 24, wherein the switching arrangement comprises:

a first switch comprising a common terminal connected to said antenna transmit/receive terminal, a second switch comprising a common terminal connected to the output terminal of said LNA, a third switch comprising a common terminal connected to said input terminal of said LNA, and a fourth switch comprising a common terminal connected to said processing circuit.

26. The T/R module according to claim 24, wherein said LNA is biased to a relatively low operating power in said receive mode, and is biased to a relatively higher operating power in said transmit mode.

27. The T/R module according to claim 24, wherein during said transmit mode said LNA operation allows aperture amplitude tapering of said antenna pattern for side lobe control.

28. The T/R module according to claim 24, wherein during said transmit mode said LNA enables multiple, simultaneous transmit beams.

* * * * *